United States Patent [19]

Herzig

[11] Patent Number: 5,166,295

[45] Date of Patent: Nov. 24, 1992

[54] SILOXANE COPOLYMERS CONTAINING ALKENYL GROUPS, PROCESS FOR PREPARING THE SAME AND THEIR USE

[75] Inventor: Christian Herzig, Taching, Fed. Rep. of Germany

[73] Assignee: Wacker-Chemie GmbH, Munich, Fed. Rep. of Germany

[21] Appl. No.: 648,106

[22] Filed: Jan. 31, 1991

[30] Foreign Application Priority Data

Feb. 1, 1990 [DE] Fed. Rep. of Germany ....... 4002879

[51] Int. Cl.$^5$ .............................................. C08G 77/06
[52] U.S. Cl. ....................................... 528/15; 528/25; 428/447; 427/387
[58] Field of Search .................... 528/15, 25; 428/447; 427/387

[56] References Cited

U.S. PATENT DOCUMENTS

| | | | |
|---|---|---|---|
| 2,983,745 | 5/1961 | Speier | 260/448.2 |
| 3,197,432 | 7/1965 | Lamoreaux . | |
| 4,208,319 | 6/1980 | August et al. | 525/100 |
| 4,311,821 | 1/1982 | Weitemeyer et al. | 528/15 |

FOREIGN PATENT DOCUMENTS

| | | |
|---|---|---|
| 0215368 | 3/1987 | European Pat. Off. . |
| 0247501 | 12/1987 | European Pat. Off. . |
| 0262806 | 4/1988 | European Pat. Off. . |

OTHER PUBLICATIONS

European Polymer Journal, vol. 9, 1973, pp. 1165-1171, J.-E. Herz et al.

*Primary Examiner*—Melvyn I. Marquis

[57] ABSTRACT

Novel siloxane copolymers are described having an average of at least two alkenyloxy groups of the formula $$-OCHR^2CR^2\!=\!CH_2,$$

in which $R^2$ represents hydrogen or a methyl radical.

These siloxane copolymers are prepared by reacting an organic compound (1) containing more than two aliphatic double bonds of the formula $OCHR^2CR^2\!=\!CH_2$ where $R^2$ is the same as above, with an organopolysiloxane (2) having at least one Si-bonded hydrogen atom per molecule in the presence of a catalyst (3) which promotes addition of the Si-bonded hydrogen to an aliphatic double bond. The resultant siloxane copolymers may be crosslinked with organopolysiloxane containing Si-bonded hydrogen in the presence of hydrosilylation catalysts.

13 Claims, No Drawings

SILOXANE COPOLYMERS CONTAINING ALKENYL GROUPS, PROCESS FOR PREPARING THE SAME AND THEIR USE

The invention relates to siloxane copolymers and more particularly to siloxane copolymers containing alkenyl groups and to a process for preparing the same The invention also relates to compositions which contain a siloxane copolymer containing alkenyl groups, an organopolysiloxane containing Si-bonded hydrogen atoms and a catalyst, and to the use of the compositions in preparing coatings which repel tacky substances.

BACKGROUND OF THE INVENTION

It is known that organopolysiloxanes containing Si-bonded vinyl groups can be reacted with organopolysiloxanes containing Si-bonded hydrogen atoms in the presence of catalysts. However, such organopolysiloxanes containing Si-bonded vinyl groups are not readily available since they have to be prepared by hydrolysis from halovinylsilanes, and they can only be prepared with difficulty.

Organopolysiloxanes containing trimethylolethanediallyl ether, trimethylolpropane-diallyl ether or pentaerythritol-triallyl ether groups, which are described in U.S. Pat. No. 4,311,821 (published Jan. 19, 1982, C. Weitemeyer et al, Th. Goldschmidt AG), are more readily available. The linking of the trimethylolethane diallyl ether, trimethylolpropane-diallyl ether or the pentaery-thritol-triallyl ether is achieved by reaction of the hydroxyl group with an Si-bonded halogen or Si-bonded alkoxy group of an organopolysiloxane. The disadvantage is that the SiOC linkage thus obtained is relatively unstable to hydrolysis in comparison with an SiC linkage.

The reaction of an organic compound containing four aliphatic double bonds, such as, for example, tetraallyloxyethane, with a silane containing Si-bonded hydrogen in the presence of a catalyst which promotes the addition of an Si-bonded hydrogen atom to an aliphatic double bond is described in U.S. Pat. No. 4,208,319 (published Jun. 18, 1980, P. August et al, Wacker-Chemie GmbH). In this reaction, yields of organosilane containing 3 aliphatic double bonds of practically 100 percent of theory are obtained. The organosilanes thus obtained are used as reinforcing additives in compositions which are based on organic polymers and fillers and can be crosslinked by sulfur or free radicals.

An object of the present invention is to provide siloxane copolymers which contain alkenyl groups Another object of the present invention is to provide a simple process for preparing siloxane copolymers containing more than one alkenyl group on a silicon atom. A further object of the present invention is to provide siloxane copolymers containing more than one alkenyl group on a silicon atom which are stable to hydrolysis. A still further object of the present invention is to provide siloxane copolymers having more than one alkenyl group which rapidly crosslink with organopolysiloxanes containing Si-bonded hydrogen atoms in the presence of a catalyst which promotes the addition of Si-bonded hydrogen to an aliphatic double bond.

SUMMARY OF THE INVENTION

The foregoing objects and others which will become apparent from the following description are accomplished in accordance with this invention, generally speaking, by providing siloxane copolymers having alkenyl groups and contain (a) siloxane units of the formula $$R_a Si(OR^1)_b O_{\frac{4-(a+b)}{2}} \quad (I)$$

in which R represents the same or different hydrocarbon radicals having from 1 to 18 carbon atom(s) per radical or halogenated hydrocarbon radicals having from 1 to 18 carbon atom(s) per radical $R^1$ is an alkyl radical having from 1 to 4 carbon atom(s) per radical which can be substituted by an ether oxygen atom, a is 0, 1, 2 or 3; b is 0, 1, 2 or 3; and the sum of a+b is not greater than 3;

(b) at least one siloxane unit, per molecule, of the formula $$GR_c SiO_{\frac{4-(c+1)}{2}} \quad (II)$$

in which R is the same as above; c is 0, 1 or 2; G represents a radical of the formula $$-CH_2 CHR^2 CHR^2 OY(OCHR^2 CR^2 = CH_2)_{x-1}$$

in which $R^2$ represents a hydrogen atom or a methyl radical; Y represents a trivalent, tetravalent, pentavalent or hexavalent hydrocarbon radical which has from 2 to 20 carbon atoms per radical and can be substituted by groups of the formula —OH; —OR³; —OSiR⁴₃;

$$-OCR^3; \\ \| \\ O$$

or —X; or can be interrupted by at least one oxygen atom or sulfur atom or one carbonyl group, or Y represents a trivalent radical of the formula $$\equiv P, \equiv P=O \text{ or } \equiv SiR^5,$$

in which $R^3$ represents an alkyl radical having from 1 to 6 carbon atom(s) per radical, $R^4$ represents a methyl, ethyl, isopropyl, tert-butyl or phenyl radical, X is a halogen atom and $R^5$ represents a monovalent hydrocarbon radical having from 1 to 8 carbon atoms(s) per radical, or Y represents a tetravalent element, such as $$\begin{array}{ccc} | & | & | \\ -C-, & -Si- & \text{or} & -Ti- \\ | & | & | \end{array}$$

and x is 3, 4, 5 or 6, and optionally (c) at least one unit, per molecule, selected from the group consisting of units of the formula $$O_{\frac{4-(c+1)}{2}} R_c Si-G^1-SiR_c O_{\frac{4-(c+1)}{2}} \quad (III)$$

$$O_{\frac{4-(c+1)}{2}} R_c Si-G^2-SiR_c O_{\frac{4-(c+1)}{2}} \text{ and} \quad (IV) \\ | \\ SiR_c O_{\frac{4-(c+1)}{2}}$$

-continued

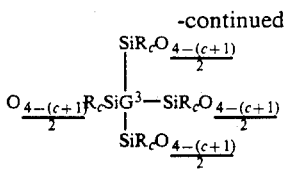   (V)

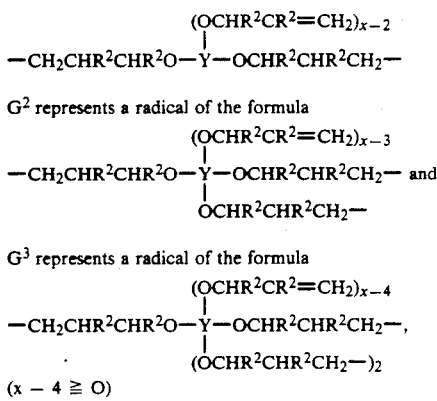

in which R and c are the same as above, $G^1$ represents a radical of the formula $$-CH_2CHR^2CHR^2O-\underset{\underset{(OCHR^2CR^2=CH_2)_{x-2}}{|}}{Y}-OCHR^2CHR^2CH_2-$$

$G^2$ represents a radical of the formula $$-CH_2CHR^2CHR^2O-\underset{\underset{OCHR^2CHR^2CH_2-}{|}}{\overset{\overset{(OCHR^2CR^2=CH_2)_{x-3}}{|}}{Y}}-OCHR^2CHR^2CH_2- \text{ and}$$

$G^3$ represents a radical of the formula $$-CH_2CHR^2CHR^2O-\underset{\underset{(OCHR^2CHR^2CH_2-)_2}{|}}{\overset{\overset{(OCHR^2CR^2=CH_2)_{x-4}}{|}}{Y}}-OCHR^2CHR^2CH_2-,$$

$(x - 4 \geqq 0)$ in which $R^2$, Y and x are the same as above.

DESCRIPTION OF THE INVENTION

The siloxane copolymers containing alkenyl groups preferably contain siloxane units of formula (I), at least one siloxane unit of formula (II) per molecule and at least one unit selected from the group consisting of units of the formulas (III), (IV) and (V) per molecule The invention also relates to a process for preparing siloxane copolymers containing alkenyl groups, which comprises reacting an organic compound (1) containing more than two aliphatic double bonds of the general formula $$Y(OCHR^2CR^2=CH_2)_x$$

in which $R^2$, Y and x are the same as above, with an organopolysiloxane (2) containing at least one Si-bonded hydrogen atom per molecule in the presence of a catalyst (3) which promotes the addition of Si-bonded hydrogen to an aliphatic double bond, in which the ratio employed of the aliphatic double bond in the organic compound (1) to the Si-bonded hydrogen in the organopolysiloxane (2) is such that siloxane copolymers are obtained which contain alkenyl groups and have an average of more than two alkenyl groups of the formula $$-OCHR^2CR^2=CH_2,$$

in which $R^2$ is the same as above.

Preferably, x is 3 or 4 and Y is a trivalent or tetravalent radical.

The organopolysiloxanes of this invention containing alkenyl groups preferably have a viscosity of from 5 to $5 \times 10^5$ mPa.s at 25° C., and more preferably from 50 to 50,000 mPa.s at 25° C.

Examples of radicals represented by R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the - and the -phenylethyl radicals The methyl radical is the preferred radical represented by R.

Examples of halogenated radicals represented by R are haloalkyl radicals, such as the 3,3,3-trifluoro-n propyl radical, the 2,2,2,2', 2',2'-hexafluoroisopropyl radical and the heptafluoroisopropyl radical, and haloaryl radicals, such as the o-, m- and p-chlorophenyl radicals.

Examples of alkyl radicals represented by $R^1$ are the methyl, ethyl, n-propyl, isopropyl, 1-n-butyl, 2-n-butyl, iso-butyl and tert-butyl radical. The methyl and ethyl radicals are the preferred radicals. Examples of alkyl radicals represented by $R^1$ which are substituted by an ether oxygen atom are the methoxyethyl and ethoxyethyl radical.

The $R^2$ radical is preferably a hydrogen atom.

Examples of alkyl radicals represented by $R^3$ are the methyl, ethyl, n-propyl, iso-propyl, 1-n-butyl, 2-n-butyl, iso-butyl, tert-butyl, n-pentyl, iso-pentyl, neo-pentyl and tert-pentyl radical and hexyl radicals, such as the n-hexyl radical.

Examples of radicals represented by $R^5$ are alkyl radicals such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl radical; alkaryl radicals, such as o-, m- and p-tolyl radicals, xylyl radicals and ethylphenyl radicals; and aralkyl radicals, such as the benzyl radical and the α- and β-phenethyl radicals.

Preferred siloxane copolymers containing alkenyl groups are those which contain (a) siloxane units of the formula $R_2SiO$   (I')

(b) at least two siloxane units of the formula

   (II')

per molecule, and (c) at least one unit of the formula

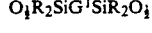   (III')

in which R, G and $G^1$ are the same as above.

Examples of the organic compound (1) which contains more than two aliphatic double bonds and is employed in the process of this invention are those of the formula

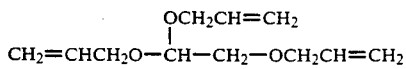
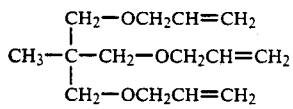
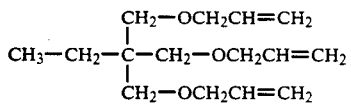
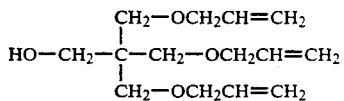
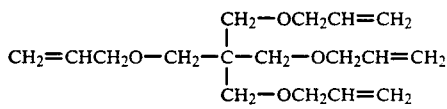

(CH₂=CHCH₂O)₂CHCH(OCH₂CH=CH₂)₂
(CH₂=CHCH₂O)₂CHCH₂CH(OCH₂CH=CH₂)₂
CH₃C(OCH₂CH=CH₂)₃
C(OCH₂CH=CH₂)₄
(CH₂=CHCH₂O)CH₂[CH(OCH₂CH=CH₂)]₃CH₂(OCH₂CH=CH₂)
(CH₂=CHCH₂O)CH₂[CH(OCH₂CH=CH₂)]₄CH₂(OCH₂CH=CH₂)
Si(OCH₂CH=CH₂)₄
Si[OCH(CH₃)CH=CH₂]₄
P(OCH₂CH=CH₂)₃,
O=P(OCH₂CH=CH₂)₃ and
(R⁶O—CH₂—)₄₋ₖC(—CH₂—OCH₂CH=CH₂)ₖ in which $R^6$ represents hydrogen or a radical of the formula $$\underset{CH_3C-}{\overset{O}{\underset{\|}{}}}$$

and k is an average of from 2.5 to 3.5, and more preferably about 2.9. The last mentioned compound and tetraallyloxyethane are the preferred examples.

Examples of the radical represented by Y are those of the formula

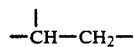
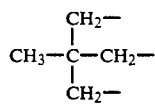
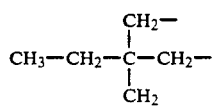
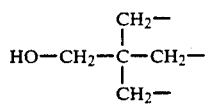

-continued

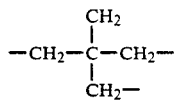
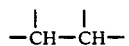
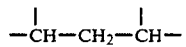
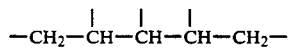
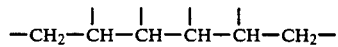

-continued $\equiv P$ and $\equiv P=O$.

Processes for the preparation of the organic compound (1) are described in EP-B 46,731 (published 3 October 1984, F. Lohse et al, Ciba-Geigy AG).

The compound of the formula $$(HOCH_2)_{4-k}C(CH_2OCH_2CH=CH_2)_k$$

in which k is 2.9, is commercially available, for example, from Shell AG, and is marketed as pentaerythritol-triallyl ether. The compound of the formula $$(CH_3-\underset{\underset{O}{\|}}{C}-O-CH_2)_{4-k}C(CH_2OCH_2CH=CH_2)_k$$

in which k is an average of from 2.5 to 3.5, and more preferably about 2.9, is obtained by reacting the above compound with acetic anhydride or isopropenyl acetate The organopolysiloxanes (2) having at least one Si-bonded hydrogen atom which are preferably employed in the process of this invention are those of the general formula $$H_eR_fSiO_{\frac{4-(e+f)}{2}} \qquad (VI)$$

in which R is the same as above, e is 0 or 1, with an average of from 0.005 to 1.0; f is 0, 1, 2 or 3; with an average of from 1.0 to 2.0; and the sum of e+f is not greater than 3.

Organopolysiloxanes (2) having at least one Si-bonded hydrogen atom which are preferably employed in the process of this invention are those of the general formula $$H_dR_{3-d}SiO(SiR_2O)_o(SiRHO)_pSiR_{3-d}H_d \qquad (VII)$$

in which R is the same as above, d is 0 or 1, o is 0 or an integer from 1 to 1000, and p is 0 or an integer of from 1 to 6.

The organopolysiloxanes (2) employed in the process of this invention preferably contain from 2 to 6 Si-bonded hydrogen atoms per molecule.

The organopolysiloxanes (2) having at least one Si-bonded hydrogen atom per molecule, preferably have a viscosity of from 0.5 to 20,000 mPa.s at 25° C., and more preferably from 5 to 1000 mPa.s at 25° C.

Preferred examples of organopolysiloxanes of formula (VII) are copolymers of dimethylhydrogensiloxane and dimethylsiloxane units, copolymers of dimethylhydrogensiloxane, dimethylsiloxane and methylhydrogensiloxane units, copolymers of trimethylsiloxane and methylhydrogensiloxane units and copolymers of trimethylsiloxane, dimethylsiloxane and methylhydrogensiloxane units.

Processes for preparing organopolysiloxanes having at least one Si-bonded hydrogen atom per molecule, including those of the preferred type, are generally known.

The organic compound (1) is employed in the process of this invention in amounts such that the aliphatic double bond in the organic compound (1) and the Si-bonded hydrogen in the organopolysiloxane (2) are present in a ratio of preferably from 1.5:1 to 20:1, and more preferably from 2:1 to 10:1. The organic compound (1) can be combined with the organopolysiloxane (2) almost as desired within very wide limits, depending on their functionality and their molecular weight. However, a ratio of C=C:SiH of greater than 20:1 leads exclusively to monohydrosilylation of the organic compound (1), which is not preferred.

The reaction of the organic compound (1), such as tetraallyloxyethane, with the organopolysiloxane (2), such as α,ω-dihydrogendimethylpolysiloxane, in the presence of catalyst (3) proceeds in accordance with the following equation:

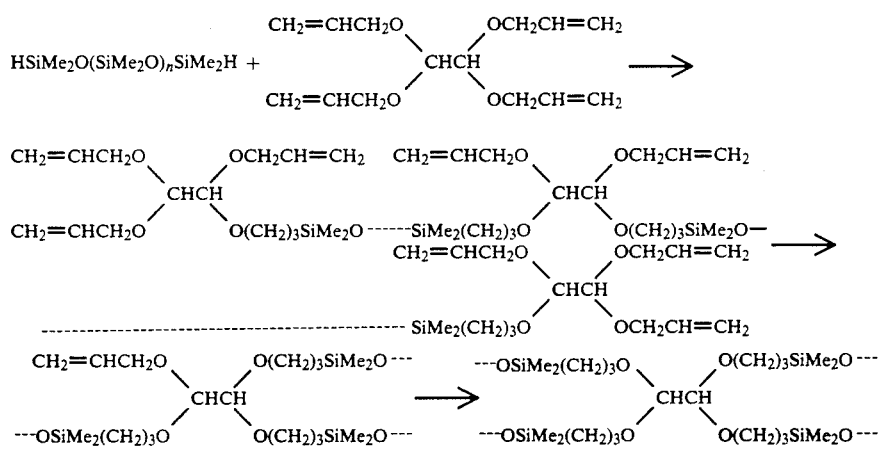

The course of the reaction and therefore the resulting end product depends on the ratio employed of the C=C double bond in the organic compound (1) to the Si-bonded hydrogen in the organopolysiloxane (2). Depending on the ratio of C=C:SiH employed, in which the ratio of C=C:SiH is always greater than 1, siloxane copolymers are obtained which contain, at the chain end and along the chain, free alkenyl groups of the formula $$-OCHR^2CR^2=CH_2, \text{ such as } -OCH_2CH=CH_2.$$

It is possible for branching to occur along the chain by further reaction of the free alkenyl groups along the chain with the Si-bonded hydrogen atoms of the organopolysiloxane (2).

The same catalysts which have been or could have been used heretofore for promoting the addition of Si-bonded hydrogen to an aliphatic double bond can also be employed as catalysts (3) which promote the addition of Si-bonded hydrogen to an aliphatic multiple bond in the process of this invention. Catalysts (3) are preferably a metal from the group of platinum metals, or a compound or a complex from the group of platinum metals Examples of such catalysts are metallic and finely divided platinum, which can be supported on carriers, such as silicon dioxide, aluminum oxide or active charcoal, compounds or complexes of platinum, such as platinum halides, for example $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6.6H_2O$ and cyclohexanone, platinum-vinylsiloxane complexes, such as platinum-1,3-divinyl-1,1,3,3-tetramethyldisiloxane complexes which contain or are free of detectable inorganically bonded halogen, bis-(gamma-picoline)-platinum dichloride, trimethylenedipyridineplatinum dichloride, dicyclopentadieneplatinum dichloride, dimethyl sulfoxide-ethylene-platinum(II) dichloride and reaction products of platinum tetrachloride with an olefin and primary amine or secondary amine or a primary and secondary amine in accordance with U.S. Pat. No. 4,292,434, such as the reaction product of platinum tetrachloride dissolved in 1-octene with sec-butylamine, or ammonium-platinum complexes according to EP-B 110,370.

Catalyst (3) is preferably employed in amounts of from 0.5 to 1000 ppm by weight (parts by weight per million parts by weight), and more preferably in amounts of from 2 to 50 ppm by weight, calculated as elemental platinum and based on the total weight of the organic compound (1) and organopolysiloxane (2).

The process of this invention is preferably carried out at the pressure of the surrounding atmosphere, that is, for example, under 1020 hPa (absolute), but it can also be carried out under higher or lower pressures. The process of this invention is also preferably carried out at a temperature of from 50° C. to 150° C., and more preferably from 80° C. to 130° C.

Inert organic solvents can be used in the process of this invention, although the additional use of inert organic solvents is not preferred. Examples of inert organic solvents are toluene, xylene, octane isomers, butyl acetate, 1,2-dimethoxyethane, tetrahydrofuran and cyclohexane.

Excess organic compound (1) and inert organic solvent, if used, are preferably removed by distillation from the siloxane copolymers which contain alkenyl groups that have been prepared by the process of this invention.

If appropriate, the siloxane copolymers which contain alkenyl groups and have been prepared by the process of this invention are equilibrated with an organopolysiloxane (4).

The organopolysiloxanes (4) employed are preferably those selected from the group consisting of linear organopolysiloxanes containing terminal triorganosiloxy groups, of the formula $$R_3SiO(SiR_2O)_rSiR_3$$

in which R is the same as above and r is 0 or an integer having a value of from 1 to 1500, linear organopolysiloxanes containing terminal hydroxyl groups, of the formula $$HO(SiR_2O)_sH$$

in which R is the same as above and s is an integer having a value of from 1 to 1500, cyclic organopolysiloxanes of the formula $$(R_2SiO)_t$$

in which R is the same as above and t is an integer of from 3 to 12, and copolymers having units of the formula $$R_2SiO \text{ and } RSiO_{3/2}$$

in which R is the same as above.

The ratio of the amount of organopolysiloxane (4) employed in the equilibration carried out, if appropriate, to siloxane copolymers containing alkenyl groups is determined merely by the desired content of alkenyl groups in the siloxane copolymers produced by the equilibration and by the mean chain length desired.

Basic catalysts which promote equilibration are preferably employed in the equilibration which is carried out, if appropriate. Examples of such catalysts are alkali metal hydroxides, such as sodium hydroxide and potassium hydroxide, trimethylbenzylammonium hydroxide and tetramethylammonium hydroxide. Alkali metal hydroxides are preferred. The alkali metal hydroxides are preferably used in amounts of from 50 to 10,000 ppm (parts per million) by weight, and more preferably from 500 to 2000 ppm by weight, based on the total weight of siloxane copolymer containing alkenyl groups and organopolysiloxane (4) employed. Although the use of acidic equilibration catalysts is possible, it is not preferred.

The equilibration which is carried out, if appropriate, is preferably carried out at 100° C. to 150° C. under the pressure of the surrounding atmosphere, that is at about 1020 hPa (absolute). However, higher or lower pressures can also be used if desired The equilibration is preferably carried out in from 5 to 20 percent by weight, of a water-immiscible solvent, such as toluene, based on the total weight of the particular siloxane copolymer containing alkenyl groups and the organopolysiloxane (4) employed. The catalyst can be rendered inactive before working up of the mixture obtained during equilibration.

The process of this invention can be carried out batchwise, semi-continuously or continuously.

Like the organopolysiloxanes containing Si-bonded vinyl groups, the siloxane copolymers of this invention containing alkenyl groups can be crosslinked with organopolysiloxanes containing Si-bonded hydrogen in the presence of hydrosilylation catalysts. The siloxane copolymers of this invention containing alkenyl groups can also be crosslinked with organic polymers containing mercapto groups.

The siloxane copolymers of this invention containing alkenyl groups are used in compositions which contain (A) a siloxane copolymer which contains alkenyl groups and preferably contains units of formula (I), (II) and, optionally, at least one of the units of the formulas (III), (IV) or (V), preferably units of the formula (I'), (II') and (III'), (B) an organopolysiloxane containing Si-bonded hydrogen atoms; and (C) a catalyst which promotes the addition of Si-bonded hydrogen to an aliphatic double bond.

Organopolysiloxanes of formula (VI), preferably those of the formula $$H_dR_{3-d}SiO(SiR_2O)_o(SiRHO)_qSiR_{3-d}H_d \qquad (VIII)$$

in which R is the same as above; d is 0 or 1; o is 0 or an integer of from 1 to 1000; and q is 0 or an integer from 1 to 50, preferably from 5 to 50, are preferably used as component (B).

The catalysts (3) mentioned above are preferably used as component (C).

The compositions can also contain other additives, such as (D) agents which delay the addition of Si-bonded hydrogen to an aliphatic double bond at room temperature. Such inhibitors are described, for example, in U.S. Pat. No. 3,933,880. Examples of these are acetylenically unsaturated alcohols, such as 3-methyl-1-butyn-3 ol, 1-ethynylcyclohexan -1-ol, 3,5-dimethyl-1-hexyn-3-ol, 3-methyl-1-pentyn-3-ol and other similar compounds.

The compositions containing the siloxane copolymers of this invention are used in the preparation of coatings which repel tacky substances.

The compositions containing the siloxane copolymers of this invention are preferably crosslinked by ultraviolet light, ultraviolet light having wavelengths in the range of from 200 to 400 nm being preferred, and/or by heat, in which temperatures of from 20° C. to 100° C. are preferred. The ultraviolet light can be generated, for example, in xenon lamps or low pressure mercury, medium pressure mercury or high pressure mercury lamps. Light with a wavelength of from 400 to 600 nm, that is to say so-called "halogen light", is also suitable for crosslinking by means of light. The compositions containing the siloxane copolymers of this invention can be crosslinked by light in the visible range if commercially available photosensitizers are also used. Energy sources for crosslinking the compositions containing the siloxane copolymers of this invention by means of heat are furnaces, heating channels, heated rollers, heated plates or heat rays of the infrared range.

Examples of substrates onto which the coatings of this invention can be applied are those of paper, wood, cork, plastic films, such as, polyethylene films or polypropylene films, ceramic objects, glass, including glass fibers, metals, paperboard, including that made of asbestos, and woven and nonwoven cloth of natural or synthetic organic fibers.

The compositions containing the siloxane copolymers of this invention can be applied to the surfaces to be coated in any desired manner which is suitable and known in many instances for the production of coatings from liquid substances, for example by dipping, brushing, pouring, spraying, rolling on, printing, for example by means of an offset gravure covering device, or knife or doctor blade coating.

EXAMPLE 1

About 2.7 mg of platinum in a solution of platinum tetrachloride in 1-octene are added to 127 g of 1,1,2,2-tetraallyloxyethane. The mixture is heated to 110° C. and 78 g of an α,w-dihydrogendimethylpolysiloxane having a viscosity of 3.7 mm$^2 \times$s$^{-1}$ at 25° C. and containing 0.32 percent by weight of Si-bonded hydrogen are added dropwise to this mixture at 110° C. under a nitrogen atmosphere, with stirring After the mixture has been stirred at 110° C. for about 3 hours, 98 percent of the Si-bonded hydrogen atoms of the α,ω-dihydrogendimethylpolysiloxane have reacted. All the volatile constituents are then removed by distillation at 120° C. under 10$^{-3}$ hPa (absolute). A clear yellowish oil having a viscosity of 61 mm$^2 \times$s$^{-1}$ at 25° C. and an iodine number (number which specifies how many g of iodine are bonded by 100 g of substance) of 111 is obtained A ratio of dimethylsiloxane unit to allyloxy group of 1.75 can be seen for the dimethylpolysiloxane copolymer containing allyloxy groups from the $^1$H-NMR spectrum.

EXAMPLE 2

About 89 g of 1,1,2,2-tetraallyloxyethane are mixed with 5.4 mg of platinum in a solution of platinum tetrachloride in 1-octene and the mixture is heated to 110° C. About 581 g of an α,w-dihydrogendimethylpolysiloxane having a chain length of 63 are added dropwise to this mixture at 110° C. over a period of 30 minutes under a nitrogen atmosphere, with stirring After the mixture has been stirred at 110° C. for about 3 hours, 98 percent of the Sio bonded hydrogen atoms of the α,w-dihydrogendimethylpolysiloxane have reacted All the volatile constituents are then removed by distillation at 120° C. under 10$^{-3}$ hPa. A dimethylpolysiloxane copolymer which contains allyloxy groups and has a viscosity of 380 mm$^2 \times$s$^{-1}$ at 25° C. and iodine number of 19.6 is obtained A ratio of dimethylsiloxane unit to allyloxy group of 17 for the siloxane copolymer can be seen from the $^1$H-NMR spectrum.

EXAMPLE 3

About 127 g of 1,1,2,2-tetraallyloxyethane are mixed with 10.8 mg of platinum in a solution of platinum tetrachloride in 1-octene and the mixture is heated to 110° C.. About 345 g of a copolymer containing methylhydrogensiloxane, dimethylsiloxane and trimethylsiloxane units which has a viscosity of 85 mm$^2 \times$s$^{-1}$ at 25° C. and contains 0.058 percent by weight of Si-bonded hydrogen and an average of 3.2 Si-bonded hydrogen atoms per molecule are added dropwise to this mixture at 110° C. under a nitrogen atmosphere, with stirring. After the mixture has been stirred at 110° C. for about 22 hours, 96 percent of the Si-bonded hydrogen atoms of the copolymer have reacted All the volatile constituents are then removed by distillation at 120° C. under 10$^{-3}$ hPa (absolute). After filtration, 320 g of a clear yellow oil having a viscosity of 387 mm$^2 \times$s$^{-1}$ at 25° C. and an iodine number of 24 are obtained. The siloxane copolymer thus obtained is non-crosslinked and is soluble in toluene to give a clear solution.

EXAMPLE 4

About 48 g of pentaerythritol-triallyl ether (obtainable from Shell; with an iodine number of 281) are mixed with 2.2 mg of platinum in a solution of platinum tetrachloride in 1-octene and the mixture is heated to 105° C. About 435 g of an α,w-dihydrogendimethylpolysiloxane which has a viscosity of 56 mm$^2 \times$s$^{-1}$ at 25° C. and contains 0.046 percent by weight of Si-bonded hydrogen are added dropwise to this mixture. After the mixture has been stirred for about 7 hours, 98 percent of the Si-bonded hydrogen atoms of the α,w-dihydrogendimethylpolysiloxane have reacted. The volatile constituents are then removed by distillation at 120° C. under 10$^{-3}$ hPa (absolute). After filtration, 380 g of a clear liquid having a viscosity of 810 mm$^2 \times$s$^{-1}$ at 25° C. and an iodine number of 11.0 are obtained. A ratio of dimethylsiloxane unit to allyloxy group of 28.2 for the siloxane copolymer containing allyloxy groups can be seen from the $^1$H-NMR spectrum.

EXAMPLE 5

About 40.5 g of tetrakis(1-methyl-2-propenyloxy)silane, prepared by transesterification of tetramethoxysilane with sec-butanol, are mixed with 27 mg of platinum in a solution of platinum tetrachloride in 1-octene and the mixture is heated to 105° C. About 291 g of an α,w-dihydrogendimethylpolysiloxane having a chain length of 63 are added dropwise to this mixture at 105° C., while stirring. After the mixture has been stirred at 105° C. for about 5 hours, 95.5 percent of the Si-bonded hydrogen atoms of the α,w-dihydrogendimethylpolysiloxane have reacted. The volatile constituents are then removed by distillation at 120° C. under 10$^{-3}$ hPa (absolute). About 254 g of a clear product having a viscosity of 3860 mm$^2 \times$s$^{-1}$ at 25° C. and an iodine number of 15 are obtained. A ratio of dimethylsiloxane unit to 1-methyl-2-propenyloxy group of 55 for the dimethylpolysiloxane copolymer containing 1-methyl-2-propenyloxy groups can be seen from the $^{-1}$H-NMR spectrum.

EXAMPLE 6

About 25.9 g of the product from Example 2 (20 mmol of allyloxy groups) are mixed with 34 mg of a 7 percent solution of platinum tetrachloride in 1-octene. About 1.2 g of a copolymer containing methylhydrogensiloxane and trimethylsiloxane units having a viscosity of 20 mm$^2 \times$s$^{-1}$ (20 mmol of Si-bonded hydrogen) are added to the mixture. The mixture is then brushed onto paper at a thickness of about 2 μm. It hardens at 25° C. in less than 1 minute to give a non-tacky coating.

EXAMPLE 7

(a) About 395 g of an industrial mixture of pentaerythritol-di-, pentaerythritol-tri- and pentaerythritol-tetraallyl ether (corresponding to 2.0 mol of OH groups) are acylated with 250 g of isopropenyl acetate and 20 drops of concentrated H$_2$SO$_4$ under reflux for 4 hours. Acetone is continuously distilled off over the top and the residue is subjected to fractional distillation in vacuo. About 412 g of a clear product which has an iodine number of 250 and, according to the $^{-1}$H-NMR spectrum, is free from methylol groups are obtained. (b) About 67.1 g (corresponding to 0.66 mol of C=C) of the acylated allyl ether mixture, the preparation of which is described in (a) above, are mixed with 2 mg of platinum in a solution of platinum tetrachloride in 1-octene and the mixture is heated to 110° C. About 384.6 g of an α,w-dihydrogendimethylpolysiloxane having a chain length of 52 are added dropwise to this mixture at 110° C. under a nitrogen atmosphere, with stirring After the mixture has been stirred at 110° C. for 5 hours, 98 percent of the Si-bonded hydrogen atoms of the α,w-dihydrogendimethylpolysiloxane have reacted. All the volatile constituents are then removed by distillation at 140° C. under 10$^{-3}$ hPa (absolute). About 380 g of a clear yellow siloxane copolymer which has a viscosity of 330 mm$^2 \times$s$^{-1}$ and contains allyloxy groups both on the chain end and along the chain (about 2120 g of the siloxane copolymer contain 1 mol of allyloxy groups) are obtained.

EXAMPLE 8

About 21.2 g of the product from Example 7 (10 mmol of allyloxy groups) are mixed with 75 mg of 3-methyl-1-butyn-3-ol, 1.2 g of a copolymer containing methylhydrogensiloxane and trimethylsiloxane units having a viscosity of 20 mm$^2 \times$s$^{-1}$ at 25° C. (20 mmol of Si-bonded hydrogen) and 240 mg of a solution of platinum tetrachloride in isopropanol which contains 1 percent of platinum, calculated as the element. The ready-to-use mixture containing inhibitor contains 100 ppm by weight of platinum, calculated as the element, and is processible at 25° C. in a closed vessel over 8 hours. The mixture is applied by means of a glass rod to coated kraft paper in a thickness of about 2 μm. During a residence time of 5 seconds in a circulating air oven at 80° C., the coating hardens to a non-tacky, rubbery covering which exhibits no "rub-off" and repels adhesive labels coated with acrylate adhesive.

What is claimed is:

1. A siloxane copolymer having alkenyl groups and contains
(a) siloxane units of the formula $$R_a Si(OR^1)_b O_{\frac{4-(a+b)}{2}} \quad (I)$$

in which R is selected from the group consisting of hydrocarbon radicals having from 1 to 18 carbon atom(s) per radical and halogenated hydrocarbon radicals having from 1 to 18 carbon atom(s) per radical, R$^1$ is an alkyl radical having from 1 to 4 carbon atom(s) per radical which can be substituted by an ether oxygen atom; a is 0, 1, 2 or 3; b is 0, 1, or 3; and the sum of a+b is not greater than 3;

(b) at least one siloxane unit per molecule of the formula $$GR_c SiO_{\frac{4-(c+1)}{2}} \quad (II)$$

in which R is the same as above, c is 0, 1 or 2, G is a radical of the formula

—CH$_2$CHR$^2$CHR$^2$OY(OCHR$^2$CR$^2$=CH$_2$)$_{x-1}$ in which R$^2$ is selected from the group consisting of a hydrogen atom and a methyl radical; Y is a trivalent, tetravalent, pentavalent or hexavalent hydrocarbon radical which has from 2 to 20 carbon atoms per radical which can be substituted by groups of the formula —OH; —OCR$^3$; —OSiR$^4{}_3$;

$$\begin{array}{c} -\text{OCR}^3; \\ \| \\ \text{O} \end{array}$$

or —X; or can be interrupted by at least one oxygen atom or sulfur atom or one carbonyl group, or Y represents a trivalent radical of the formula =P, =P=O or SiR$^5$, in which R$^3$ is an alkyl radical having from 1 to 6 carbon atom(s) per radical, R$^4$ is selected from the group consisting of a methyl, ethyl, isopropyl, tert-butyl and phenyl radical, X is a halogen atom and $R^5$ is a monovalent hydrocarbon radical having from 1 to 8 carbon atoms(s) per radical, or Y represents a tetravalent element selected from the group consisting of

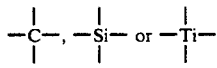

and x is 3, 4, 5 or 6, and optionally
(c) at least one unit per molecule selected from the group consisting of units of the formulas

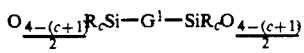  (III)

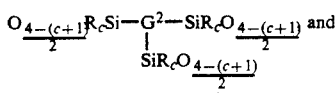  (IV)

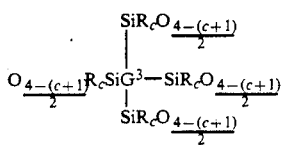  (V)

in which R and c are the same as above, $G^1$ is a radical of the formula

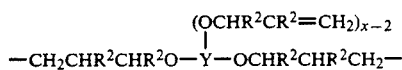

$G^2$ is a radical of the formula

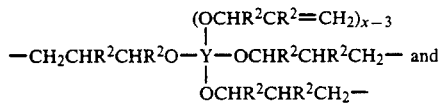

$G^3$ is a radical of the formula

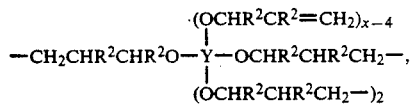

in which $R^2$, Y and x are the same as above.

2. The siloxane copolymer of claim 1, which contains siloxane units of formula (I), at least one siloxane unit of formula (II) per molecule and at least one unit selected from the group consisting of units of the formulas (III), (IV) and (V) per molecule.

3. The siloxane copolymer of claim 1, which contains
(a) siloxane units of the formula $R_2SiO$  (I'), (b) at least two siloxane units of the formula per molecule

  (II')

and (c) at least one unit of the formula $O_\frac{1}{2}R_2SiG^1SiR_2O_\frac{1}{78}$  (III')

per molecule in which R is selected from the group consisting of hydrocarbon radicals having from 1 to 18 carbon atom(s) per radical and halogenated hydrocarbon radicals having from 1 to 18 carbon atom(s) per radical, G is a radical of the formula

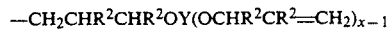

$G^1$ is a radical of the formula

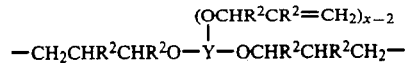

which $R^2$ is selected from the group consisting of a hydrogen atom and a methyl radical, x is 3, 4, 5 or 6 and Y is a trivalent, tetravalent, pentavalent or hexavalent hydrocarbon radical which has 2 to 20 carbon atoms per radical which can be substituted by groups of the formula —OH, —$OR^3$, —$OSiR^4_3$,

or —X, or can be interrupted by at least one oxygen atom or sulfur atom or one carbonyl group, or Y represents a trivalent radical of the formula

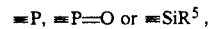, $R^3$ is an alkyl radical having from 1 to 6 carbon atom(s) per radical, $R^4$ is selected from the group consisting of a methyl, ethyl, isopropyl, tert-butyl and phenyl radical, X is a halogen atom and $R^5$ a monovalent hydrocarbon radical having from 1 to 8 carbon atom(s) per radical, or Y represents a tetravalent element selected from the group consisting of

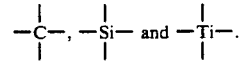.

4. The siloxane copolymer of claim 2, which contains
(a) siloxane units of the formula $R_2SiO$  (I'), (b) at least two siloxane units of the formula per molecule

  (II')

and (c) at least one unit of the formula

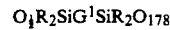  (III')

per molecule in which R is selected from the group consisting of hydrocarbon radicals having from 1 to 18 carbon atom(s) per radical and halogenated hydrocarbon radicals having from 1 to 18 carbon atom(s) per radical, G is a radical of the formula

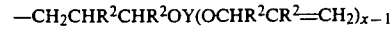

G1 is a radical of the formula $$-CH_2CHR^2CHR^2O-Y\overset{(OCHR^2CR^2=CH_2)_{x-2}}{-}OCHR^2CHR^2CH_2-$$

in which $R^2$ is selected from the group consisting of a hydrogen atom and a methyl radical, x is 3, 4, 5 or 6 and Y is a trivalent, tetravalent, pentavalent or hexavalent hydrocarbon radical which has 2 to 20 carbon atoms per radical which can be substituted by groups of the formula $-OH$, $-OR^3$, $-OSiR^4_3$, $$-O\overset{O}{\underset{\|}{C}}R^3,$$

or $-X$, or can be interrupted by at least one oxygen atom or sulfur atom or one carbonyl group, or Y represents a trivalent radical of the formula $$\equiv P, \equiv P=O \text{ or } \equiv SiR^5,$$

$R^3$ is an alkyl radical having from 1 to 6 carbon atom(s) per radical, $R^4$ is selected from the group consisting of a methyl, ethyl, isopropyl, tert-butyl and phenyl radical, X is a halogen atom and $R^5$ is a monovalent hydrocarbon radical having from 1 to 8 carbon atom(s) per radical, or Y represents a tetravalent element selected from the group consisting of $$-\overset{|}{\underset{|}{C}}-, -\overset{|}{\underset{|}{Si}}- \text{ and } -\overset{|}{\underset{|}{Ti}}-.$$

5. A process for preparing the siloxane copolymer of claim 1, which comprises reacting an organic compound (1) containing more than two aliphatic double bonds, of the general formula $$Y(OCHR^2CR^2=CH_2)_x$$

in which $R^2$ is selected from the group consisting of a hydrogen atom and a methyl radical, x is 3, 4, 5 or 6 and Y is a trivalent, tetravalent, pentavalent or hexavalent hydrocarbon radical which has from 2 to 20 carbon atoms per radical and can be substituted by groups of the formula $-OH$, $-OR^3$, $-OSiR^4_3$, $$-O\overset{O}{\underset{\|}{C}}R^3,$$

or $-X$, or can be interrupted by at least one oxygen atom or sulfur atom or one carbonyl group, or Y represents a trivalent radical of the formula $$\equiv P, \equiv P=O \text{ or } \equiv SiR^5,$$

in which $R^3$ is an alkyl radical having from 1 to 6 carbon atom(s) per radical, $R^4$ is selected from the group consisting of a methyl, ethyl, isopropyl, tert butyl and phenyl radical, X is a halogen atom and R5 is a monovalent hydrocarbon radical having from 1 to 8 carbon atom(s) per radical, or Y represents a tetravalent element selected from the group consisting of $$-\overset{|}{\underset{|}{C}}-, -\overset{|}{\underset{|}{Si}}- \text{ and } -\overset{|}{\underset{|}{Ti}}-,$$

an organopolysiloxane (2) containing at least one Si-bonded hydrogen atom per molecule in the presence of a catalyst (3) which promotes the addition of Si-bonded hydrogen to an aliphatic double bond, in which the ratio of the aliphatic double bond in the organic compound (1) to the Si-bonded hydrogen in the organopolysiloxane (2) is such that siloxane copolymers are formed which contain alkenyl groups having an average of more than two alkenyl groups of the formula $-OCHR^2CR^2=CH_2$, in which $R^2$ is the same as above.

6. A process for preparing the siloxane copolymer of claim 2, which comprises reacting an organic compound (1) containing more than two aliphatic double bonds of the general formula $$Y(OCHR^2CR^2=CH_2)_x$$

in which $R^2$ is selected from the group consisting of a hydrogen atom and a methyl radical, x is 3, 4, 5 or 6 and Y is a trivalent, tetravalent, pentavalent or hexavalent hydrocarbon radical which has from 2 to 20 carbon atoms per radical and can be substituted by groups of the formula $-OH$, $-OR^3$, $-OSiR^4_3$, $$-O\overset{O}{\underset{\|}{C}}R^3,$$

or $-X$, or can be interrupted by at least one oxygen atom or sulfur atom or one carbonyl group, or Y represents a trivalent radical of the formula $$\equiv P, \equiv P=O \text{ or } \equiv SiR^5,$$

in which $R^3$ is an alkyl radical having from 1 to 6 carbon atom(s) per radical, $R^4$ is selected from the group consisting of a methyl, ethyl, isopropyl, tert-butyl and phenyl radical, X is a halogen atom and $R^5$ is a monovalent hydrocarbon radical having from 1 to 8 carbon atom(s) per radical or Y represents a tetravalent element selected from the group consisting of $$-\overset{|}{\underset{|}{C}}-, -\overset{|}{\underset{|}{Si}}- \text{ and } -\overset{|}{\underset{|}{Ti}}-,$$

an organopolysiloxane (2) containing at least one Si-bonded hydrogen atom per molecule in the presence of a catalyst (3) which promotes the addition of Si-bonded hydrogen to an aliphatic double bond, in which the ratio of the aliphatic double bond in the organic compound (1) to the Si-bonded hydrogen in the organopolysiloxane (2) is such that siloxane copolymers are formed which contain alkenyl groups having an average of more than two alkenyl groups of the formula $-OCHR^2CR^2=CH_2$, in which $R^2$ is the same as above.

7. The process of claim 5, wherein the organic compound (1) is selected from the group consisting of tetraallyloxyethane and a compound of the formula $$(R^6OCH_2)_{4-k}C(CH_2OCH_2CH=CH_2)_k$$

in which $R^6$ is selected from the group consisting of hydrogen and a radical of the formula

and k is 3.

8. The process of claim 5, wherein the organopolysiloxane (2) having at least one Si-bonded hydrogen atom per molecule is of the general formula $$H_dR_{3-d}SiO(SiR_2O)_o(SiRHO)_pSiR_{3-d}H_d \qquad (VII)$$

in which R is selected from the group consisting of hydrocarbon radicals having from 1 to 18 carbon atom(s) per radical and halogenated hydrocarbon radicals having from 1 to 18 carbon atom(s) per radical; d is 0 or 1; o is 0 or an integer of from 1 to 1000; and p is 0 or an integer of from 1 to 6.

9. The process of claim 5, wherein the resulting siloxane copolymer containing alkenyl groups is equilibrated with an organopolysiloxane (4) selected from the group consisting of linear organopolysiloxanes containing terminal triorganosiloxy groups, linear organopolysiloxanes containing terminal hydroxyl groups, cyclic organopolysiloxanes and copolymers of diorganosiloxane and monoorganosiloxane units.

10. A composition comprising (A) the siloxane copolymer containing alkenyl groups of claim 1; (B) an organopolysiloxane containing Si-bonded hydrogen atoms; and (C) a catalyst which promotes the addition of Si-bonded hydrogen to an aliphatic double bond.

11. A composition comprising (A) the siloxane copolymer containing alkenyl groups of claim 2; (B) an organopolysiloxane containing Si-bonded hydrogen atoms; and (C) a catalyst which promotes the addition of Si-bonded hydrogen to an aliphatic double bond.

12. A composition comprising (A) the siloxane copolymer containing alkenyl groups of claim 3; (B) an organopolysiloxane containing Si-bonded hydrogen atoms; and (C) a catalyst which promotes the addition of Si-bonded hydrogen to an aliphatic double bond.

13. A coating composition which repels tacky substances which comprises applying the composition of claim 10 to a substrate.

* * * * *

UNITED STATES PATENT AND TRADEMARK OFFICE
CERTIFICATE OF CORRECTION

PATENT NO. : 5,166,295

DATED : November 24, 1992

INVENTOR(S) : Dr. Christian Herzig

It is certified that error appears in the above-identified patent and that said Letters Patent is hereby corrected as shown below:

In Claim 1, Column 14, line 55 of the Patent, change "$-OCR^3$" to --- $-OR^3$ ---; Column 14, line 65, change "$SiR^5$" to --- $\equiv SiR^5$ ---.

In Claim 2, Column 15, line 68 of the Patent, change "$O_{1/2}R_2SiG^1SiR_2O_{178}$" to --- $O_{1/2}R_2SiG^1SiR_2O_{1/2}$ ---.

In Claim 4, Column 16, line 59 of the Patent, change "$O_{1/2}R_2SiG^1SiR_2O_{178}$" to --- $O_{1/2}R_2SiG^1SiR_2O_{1/2}$ ---.

Signed and Sealed this

Twenty-sixth Day of October, 1993

Attest:

BRUCE LEHMAN

*Attesting Officer*    *Commissioner of Patents and Trademarks*